(12) United States Patent
Ametepe

(10) Patent No.: US 11,380,324 B2
(45) Date of Patent: Jul. 5, 2022

(54) METHOD FOR ASSISTING IN ADJUSTING THE DIMENSIONS OF AN INDUSTRIAL MACHINE, AND ASSOCIATED SYSTEM

(71) Applicant: COMPAGNIE GENERALE DES ETABLISSEMENTS MICHELIN, Clermont-Ferrand (FR)

(72) Inventor: Kevin Ametepe, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 85 days.

(21) Appl. No.: 16/762,256

(22) PCT Filed: Nov. 6, 2018

(86) PCT No.: PCT/FR2018/052729
§ 371 (c)(1),
(2) Date: May 7, 2020

(87) PCT Pub. No.: WO2019/092350
PCT Pub. Date: May 16, 2019

(65) Prior Publication Data
US 2021/0183382 A1   Jun. 17, 2021

(30) Foreign Application Priority Data
Nov. 7, 2017 (FR) ..................... 17/60420

(51) Int. Cl.
*G10L 15/22* (2006.01)
*G06F 16/638* (2019.01)
(Continued)

(52) U.S. Cl.
CPC ............ *G10L 15/22* (2013.01); *G05B 19/408* (2013.01); *G06F 3/167* (2013.01); *G06F 16/638* (2019.01);
(Continued)

(58) Field of Classification Search
USPC ..................................................... 704/1–504
See application file for complete search history.

(56) References Cited

U.S. PATENT DOCUMENTS

| 5,991,726 A * | 11/1999 | Immarco | ................. G10L 15/22 704/E15.04 |
| 6,356,437 B1 * | 3/2002 | Mitchell | ................. G06F 1/163 361/730 |

(Continued)

FOREIGN PATENT DOCUMENTS

EP   2 942 717 A1   11/2015

OTHER PUBLICATIONS

International Search Report dated Mar. 1, 2019, in corresponding PCT/FR2018/052729 (4 pages).

*Primary Examiner* — Marcus T Riley
(74) *Attorney, Agent, or Firm* — Venable LLP

(57) ABSTRACT

A method for assisting in adjusting the dimensions of an industrial machine, the machine being driven by an operator provided with a portable device that is provided with a microphone and with a speaker, the device being connected to a remote server hosting a database and software means, comprises the following steps: The operator transmits, via the microphone, a voice request for assistance in relation to a step in a procedure for adjusting the dimensions of the machine, the request is analysed by voice recognition means, on the basis of the request, a set of data relevant to the step to be performed is selected from the database, the relevant data are converted into an audio signal understandable to the operator, via voice synthesis means, and the audio signal is transmitted to the operator via the speaker.

6 Claims, 1 Drawing Sheet

(51) Int. Cl.
  *G05B 19/408* (2006.01)
  *G06F 3/16* (2006.01)
  *G10L 15/30* (2013.01)

(52) U.S. Cl.
  CPC .... *G10L 15/30* (2013.01); *G05B 2219/35458* (2013.01); *G10L 2015/223* (2013.01)

(56) References Cited

U.S. PATENT DOCUMENTS

| | | | |
|---|---|---|---|
| 6,895,380 B2* | 5/2005 | Sepe, Jr. | G10L 15/22 |
| | | | 704/E15.04 |
| 7,466,992 B1* | 12/2008 | Fujisaki | H04N 13/356 |
| | | | 455/566 |
| 2001/0010714 A1* | 8/2001 | Nemoto | H04M 1/642 |
| | | | 379/88.01 |
| 2002/0019737 A1* | 2/2002 | Stuart | G10L 15/26 |
| | | | 704/E15.045 |
| 2005/0080620 A1* | 4/2005 | Rao | G10L 21/0208 |
| | | | 704/226 |
| 2012/0290121 A1* | 11/2012 | Gronbach | G10L 15/22 |
| | | | 700/180 |
| 2015/0325047 A1 | 11/2015 | Conner et al. | |
| 2016/0229562 A1 | 8/2016 | Kathirvel et al. | |
| 2021/0183382 A1* | 6/2021 | Ametepe | G10L 15/30 |

\* cited by examiner

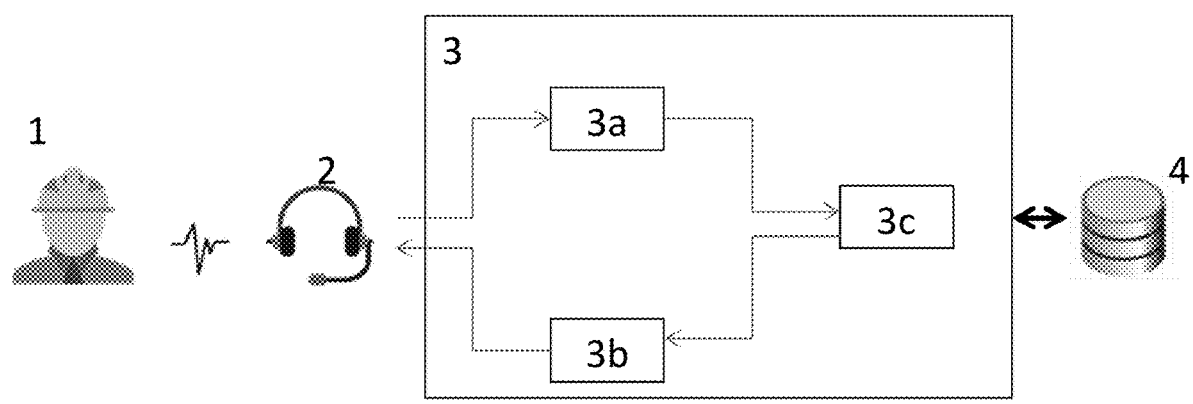

METHOD FOR ASSISTING IN ADJUSTING THE DIMENSIONS OF AN INDUSTRIAL MACHINE, AND ASSOCIATED SYSTEM

FIELD OF THE INVENTION

The present invention belongs to the field of industrial machines, and more particularly to the field of the operation and maintenance of such machines.

More specifically, the invention relates to the control of industrial machines allowing the manufacture of various products which may require dimensional parts to be changed from one product to another, for example tyres.

At present, changing dimensions on a machine of this type is a painstaking operation for an operator, who must perform a large number of manual adjustments by following instructions written in a list, for example on paper. They must also check the adjustments made, and note them down by hand in a traceability document.

These numerous operations can lead to misreads and miswrites, and thus lead to poor quality of the products produced by the machine after the change in dimensions. Thus, the invention aims to provide a solution to simplify and secure these procedures.

In the field of maintenance of industrial machines, patent EP 2 942 717, which relates to a method for providing maintenance instructions to a user, is known. However, the method described in this document does not allow the aforementioned drawbacks, related to the matter of changes in dimension, to be overcome.

SUMMARY OF THE INVENTION

Thus, the invention provides a method for assisting in adjusting the dimensions of an industrial machine, the machine being driven by an operator provided with a portable device that is provided with a microphone and with a speaker, the device being connected to a remote server hosting a database and software means, the method comprising the following steps:

- The operator transmits, via the microphone, a voice request for assistance in relation to a step in a procedure for adjusting the dimensions of the machine,
- the request is analysed by voice recognition means,
- on the basis of the request, a set of data relevant to the step to be performed is selected from the database,
- the relevant data are converted into an audio signal understandable to the operator, via voice synthesis means,
- the audio signal is transmitted to the operator via the speaker.

According to some preferred embodiments, the step of an adjustment procedure may consist of various actions:

In a first example, the step to be performed is changing a dimensional part present on the machine. In this case, the relevant data comprise, for example, at least identifying a part to be changed, and identifying the replacement part. The identification of a part is a set of elements for example in the group comprising: an identifier written on the part, a part size, the name of a part, its location on the machine, and its storage location in the plant.

In a second exemplary embodiment, the step to be performed is adjusting the dimensions of one or more elements of the machine. Specifically, in the case of a complete change of size of a machine tool, some parts must be replaced, as indicated above, and some must simply be set to different values. In this case, the relevant data comprise, for example, identifying the part to be adjusted, and one or more adjustment values to be applied. As above, the identification of the part to be adjusted is a set of elements for example in the group comprising: an identifier written on the part, a part size, the name of a part, and its location on the machine.

In a third exemplary embodiment, the step to be performed is checking the adjustment tolerances of the machine. In this case, the relevant data comprise, for example, acceptable tolerance values for one or more adjustments to the machine. Advantageously, the data also comprise an exact identification of the part to which the adjustment is to be made; the term identification here should be understood as above.

In a fourth exemplary embodiment, the step to be performed is encoding values measured after adjustment. In this case, the relevant data comprise, for example, adjustment names. In this particular example, the assistance method comprises a set of additional steps, in which:

- The operator transmits, in response to the audio signal representing the relevant data, an appropriate response.
- This response is analysed by voice recognition means and converted into data formatted to be stored in the database.

In one particular embodiment of the invention, the request transmitted by the operator is made using words in a group of predetermined words that are known to the voice recognition means.

Thus, it is possible to determine beforehand a list of words that the voice recognition means should be able to recognize and associate with an action to be carried out and with a set of relevant data to be selected from the database and to be transmitted to the operator.

These words may be of various types, such as for example:

- names of parts of a machine: stop, gun, roller, module, counter, belt output, etc.
- names of adjustment values: AD value, NST angle, NST width, height
- validation terms: compliant, correct, incorrect, etc.
- combinations of numbers and/or letters corresponding to adjustment values or to part identifiers, these combinations being known to the operator beforehand and recorded in the database.

A method according to the invention may advantageously be implemented in a plant including various types of machine, each of them having specific parts, arrangements, dimensions, etc. Thus, the step of selecting the relevant data from the database is carried out not only according to the request, but also according to the machine on which the operator is working. However, for the method to be ergonomic for the operator, it is not conceivable to ask them, on each request, to indicate the type of machine. Consequently, in one preferred embodiment, a method according to the invention comprises a preliminary step in which the operator initially transmits the identification of the machine on which they are operating.

In this case, the step of selecting relevant data from the database is performed according to the transmitted request, and to the identification of the machine.

BRIEF DESCRIPTION OF THE FIGURES

Other objects and advantages of the invention will become clearly apparent in the following description of one preferred but non-limiting embodiment, illustrated by FIG.

1, which presents a simplified diagram of the means for implementing a method according to the invention.

DETAILED DESCRIPTION

Thus, FIG. 1 shows an operator 1 provided with an audio device 2. This audio device includes means for picking up the operator's voice, for example a microphone, and means for transmitting sound to the operator.

The audio device is preferably portable, wireless, and isolating with respect to external noise. This feature is particularly important in industrial environments in which the surroundings are very noisy due to industrial machines. In one advantageous example, a device operating by bone conduction may be used.

This audio device also includes wireless communication means, allowing it to exchange signals with software means 3 installed on a plant server. These software means 3 include, in this example:
 a voice recognition software application 3a,
 a speech synthesis software application 3b, and
 a software application 3c for managing various scenarios.
  This software application 3c is linked to a database 4 in which all of the information relevant to the implementation of a method according to the invention is stored.

One exemplary implementation of the invention, comprising various steps, will now be described in detail. First, the operator requests the activation of the software means 3 by uttering a predetermined activation keyword.

Once the means have been activated, the operator indicates the type of assistance they need: assistance in changing a size, or assistance with measurements to be performed. The type of assistance chosen is recorded by software means 3.

Changing a size, for example on a complex tyre-manufacturing machine, is a complex operation which comprises a large number of tasks to be performed, including: changing dimensional parts, machine adjustments, activation/deactivation of certain functionalities, etc.

A method according to the invention makes it possible to perform such an operation in two different modes: a fully guided mode, in which the software means indicate to the operator each of the steps to be carried out; and an assisted mode, in which the operator knows the steps, and needs only receive details such as size or adjustment values. The elements described below may be applied to both operating modes.

The operator requests, by voice, adjustment values, for example by uttering the phrase "width roller A". The voice recognition means 3a analyse the audio signal received in order to understand the request received from the operator, and transmit the request to the management application 3c.

This management application 3c then retrieves the relevant data to be transmitted to the operator from the database. These relevant data are chosen from the database according to parameters including: the identification of the machine on which the operator is working, the scenario chosen by the operator in the activation step, and the adjustment request from the operator.

The relevant data from the database are synthesized by the means 3b to be converted into a voice signal understandable to the operator. It is specified here that the relevant data may relate not only to a part identifier or values, but also to information allowing the operator to be guided as to the procedure to follow.

Once the operator has made the adjustment, they may confirm successful completion using a predetermined validation word. They then request the next adjustment, and so on until they have carried out all of the operations necessary for the chosen scenario.

Another exemplary application of a method according to the invention is performing "check-list" checks on the machine. As indicated in the preamble of this application, such checks are currently performed by the operator by hand. Thus, in one embodiment of the invention, the operator launches the desired scenario, and the software application 3c retrieves, from the database, the list of elements to be checked.

The software means 3 then communicate each element, one by one, to the operator, who in return communicates the measured value. In this example, it is then possible to generate, by means of software means, a summary report of the check performed.

In light of the above, it is apparent that a method according to the invention makes it possible to make all of the adjustment, measurement and encoding procedures to be performed on a machine, in particular a tyre-manufacturing and/or -assembly machine, more ergonomic and more reliable.

The invention claimed is:

1. A method for assisting in adjusting dimensions of an industrial machine, the industrial machine being driven by an operator provided with a portable device that is provided with a microphone and with a speaker, the portable device being connected to a remote server hosting a database and software means, the method comprising the following steps:
 initially transmitting, by the operator, identification of the industrial machine which the operator is operating;
 transmitting, via the microphone, an operator voice request for assistance in relation to a step in a procedure for adjusting the dimensions of the industrial machine;
 analyzing the operator voice request using voice recognition means;
 on a basis of the operator voice request, selecting from the database a set of data relevant to the step to be performed;
 converting the set of relevant data into an audio signal understandable to the operator, via voice synthesis means; and
 transmitting the audio signal to the operator via the speaker.

2. The method according to claim 1, wherein the step in the procedure for adjusting the dimensions of the industrial machine is selected from the group consisting of changing a dimensional part present on the industrial machine, adjusting the dimensions of one or more elements of the industrial machine, checking adjustment tolerances of the industrial machine, and encoding values measured after adjustment.

3. The method according to claim 2, wherein the step in the procedure for adjusting the dimensions of the industrial machine is encoding values measured after adjustment, the method further comprising the steps:
 transmitting, in response to the audio signal representing the set of relevant data, an appropriate operator response;
 analyzing the operator response by voice recognition means; and
 converting the operator response into data formatted to be stored in the database.

4. The method according to claim 1, wherein the set of relevant data for the step to be performed are selected from the group consisting of identifying a part to be changed and identifying a replacement part, identifying one or more elements of the industrial machine and one or more values of adjustments to be applied, and tolerance values for one or more adjustments to the industrial machine.

5. The method according to claim 1, wherein the operator voice request is made using words from a group of predetermined words that are known to the voice recognition means.

6. The method according to claim 1, wherein the step of selecting relevant data is performed according to the operator voice request and according to the identification of the industrial machine.

* * * * *